E. Sweet,

Dental Mold.

No. 102,615.          Patented May 3, 1870.

Witnesses.         Inventor
C. L. Evert.        Eli Sweet
A. A. Learman    per Alexander Mason
                 Attys.

United States Patent Office.

ELI SWEET, OF WHITNEY'S POINT, NEW YORK.

Letters Patent No. 102,615, dated May 3, 1870.

IMPROVED MOLD FOR ARTIFICIAL TEETH.

The Schedule referred to in these Letters Patent and making part of the same.

*To all whom it may concern:*

Be it known that I, ELI SWEET, of Whitney's Point, in the county of Broome and in the State of New York, have invented certain new and useful Improvements in Molds for Artificial Teeth; and do hereby declare that the following is a full, clear, and exact description thereof, reference being had to the accompanying drawings and to the letters of reference marked thereon making a part of this specification.

The nature of my invention consists in providing the dovetailed slides in a mold for artificial teeth with a slot and set-screw, whereby to adjust the slide on the plate.

In order to enable others skilled in the art to which my invention appertains to make and use the same, I will now proceed to describe its construction and operation, referring to the annexed drawings, in which—

A represents the bottom part of a mold for molding artificial teeth, said mold being formed for a block of teeth as well as for a single tooth.

B is the upper part of the mold, made to correspond with the bottom part A.

In the bottom part A is a slide, C, which has projections *a a*, which, when the slide is pushed into its place, project into the space or cavity in which the teeth are formed.

Figure 1:
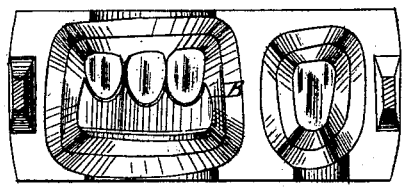
Figure 1 is a view of the top mold.
Figure 2:
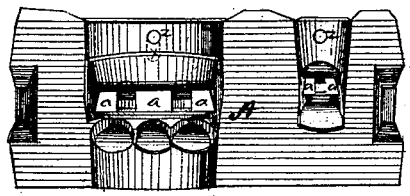
Figure 2 is a plan view of the bottom mold.
Figure 3:
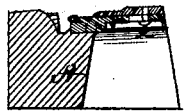
Figure 3 is a vertical cross-section of the bottom mold.
Figure 4:
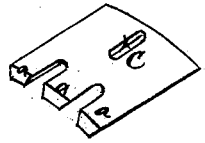
Figure 4 is a perspective view of the slide used for forming the dovetails.

The projections *a a* are beveled, as shown in fig. 4, so as to form dovetailed recesses and projections on the under or inner side of the teeth at their upper edge.

When the substance of which the teeth are to be formed is poured into the mold, the slide C should be pushed in, and as soon as they are formed the slide is drawn out, which allows the teeth to be removed from the mold.

In the dovetails thus formed on the teeth, the rubber goes to fasten them to the plate, which dispenses with the pins usually employed for that purpose, thus lessening the expense and making the teeth stronger and better.

The slides C being provided with a narrow slot, *x*, are secured to the plate A by a set-screw, *z*, so that they can readily be adjusted either in or out on the plate.

Having thus fully described my invention,

What I claim as new, and desire to secure by Letters Patent, is—

In a mold for artificial teeth, providing the slide to form dovetails in the teeth, with a slot, *x*, and set-screw *z*, whereby to adjust the slide on the plate A, substantially as and for the purposes herein set forth.

In testimony that I claim the foregoing, I have hereunto set my hand this 23d day of October, 1869.

ELI SWEET.

Witnesses:
C. L. EVERT,
FREDERICK FENNER.